UNITED STATES PATENT OFFICE.

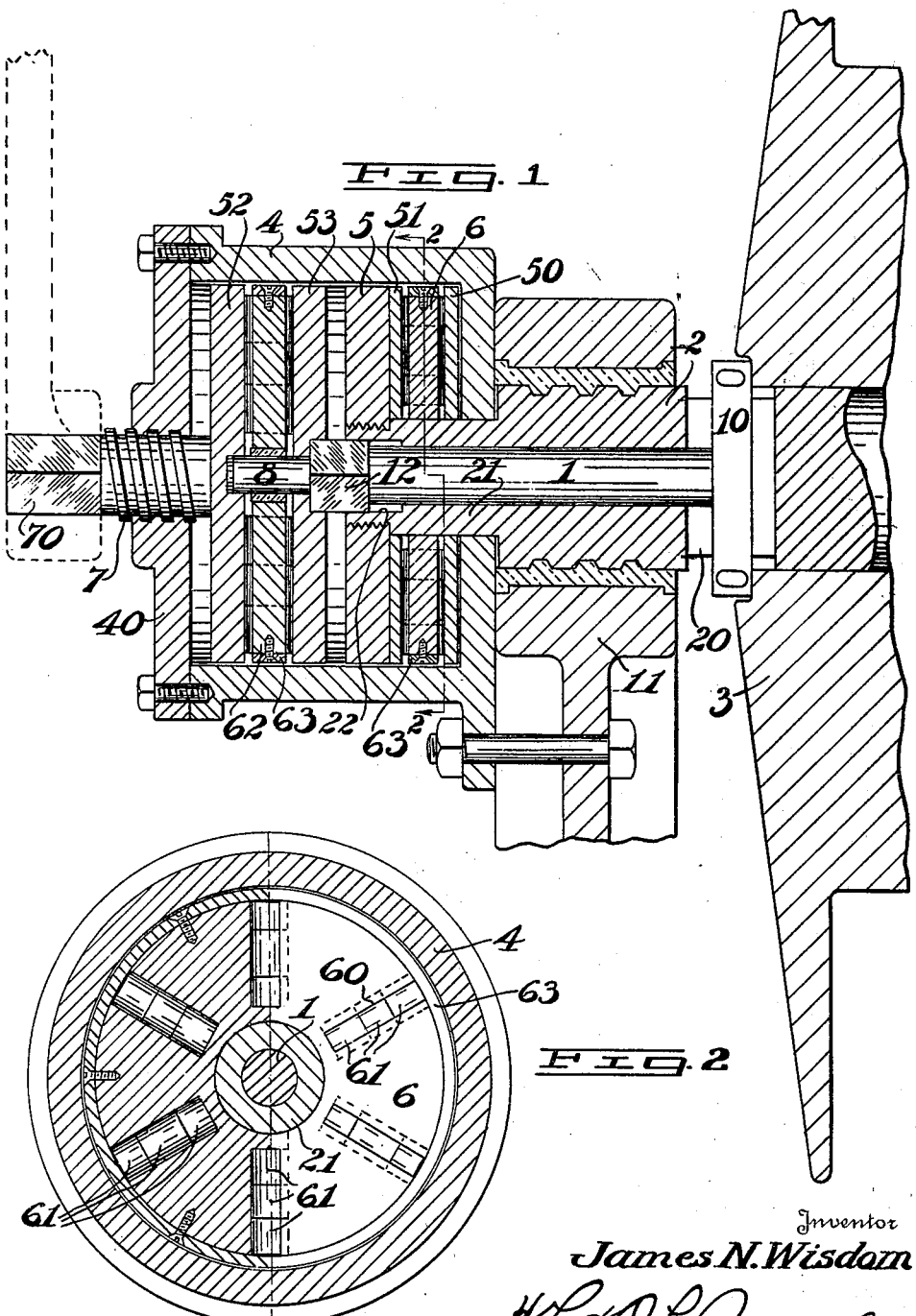

JAMES N. WISDOM, OF ELMA, WASHINGTON.

ROLLER THRUST-BEARING FOR FRICTION-DRUMS.

1,373,929.   Specification of Letters Patent.   Patented Apr. 5, 1921.

Application filed September 9, 1920. Serial No. 409,232.

*To all whom it may concern:*

Be it known that I, JAMES N. WISDOM, a citizen of the United States of America, and resident of the town of Elma, in the county of Grays Harbor and State of Washington, have invented certain new and useful Improvements in Roller Thrust-Bearings for Friction-Drums, of which the following is a specification.

My invention relates to what is known as a friction set, the same being a device which is employed in connection with friction drums to control the engagement of the drum and the driving member through a friction clutch, whereby said clutch is applied or released as desired.

The object of my invention is to provide a device for doing this work, namely, applying and releasing the friction clutch by which a drum or other mechanism is driven, which will substitute roller bearings, or equivalent antifriction bearings, for the plain sliding friction of the usual or common thrust bearings. A further object is to provide a device in which antifriction bearings are used which will be of a simple type of construction.

My invention consists of the novel parts and combination of parts which will be hereinafter described and which have been illustrated in the accompanying drawings. The particular feature of the device hereinafter described and illustrated which I deem to be my invention, will be specifically set forth in the claims which terminate this specification.

In the accompanying drawings I have shown my device in the form of construction which I now employ and which I believe to be best adapted for the purpose.

Figure 1 is an axial section taken through the friction set, or the device for applying and controlling the friction.

Fig. 2 is a cross section taken substantially on the broken line 2—2 of Fig. 1.

In connection with the operation of friction driven drums, such, for instance as those employed on hoisting engines used for pile driving, engines used for logging and for all sorts of hoisting purposes, where it is desirable to be able to frequently start and stop the drums, devices are employed whereby the friction clutch through which the drums are driven, may be quickly applied and released. In connection with devices of this sort, of a construction such as is most generally employed, it is necessary to provide a form of thrust bearing which maintains the drum driving frictions in engagement, as the type of friction drive commonly used is one which requires maintaining this thrust pressure in order to maintain sufficient pressure between the frictional driving surface.

The usual type of mechanism by which such frictional driving devices are operated consists in employing an axially bored shaft, said bore extending from one end to a point adjacent either the drum or the drum driving member, where it engages a cross key which is located within a diametrical slot in the shaft and which engages the movable member of the friction driving device. In devices of this kind the direct frictional engagement between two surfaces, one turning and the other stationary, causes great wear and consequent trouble in maintaining the parts in effective operating condition. For such straight engagement of relatively rotating surfaces I substitute roller bearings which, because of their construction, reduce the frictional wear.

In the drawings, in Fig. 1 is shown parts of the standard type of mechanism for controlling the friction mechanism between the drum and its shaft. The pin 1 is mounted in an axially positioned bore in the shaft 2, said bore extending from one end to a point adjacent the drum 3, where it communicates with a transversely positioned slot 20 in the shaft. In this slot 20 is placed a cross key 10 which projects from the shaft at each end and has said projecting ends engaging or connected with the drum 3, so that said drum, which is loosely mounted upon the shaft, may be moved lengthwise of the shaft for engagement of the drum-driving friction devices. This type of structure as so far described, is of standard construction.

The shaft 2 is mounted to turn within bearings carried by the frame 11. The end of the shaft projects somewhat beyond the outer surface of its bearing in the frame. Surrounding this projecting end of the shaft is a casing 4, within which is assembled the antifrictional bearing which absorbs the end thrust. This casing 4 is secured against rotation by engagement with the frame, or in any suitable manner.

I have shown the projecting end of the shaft as being turned down so as to reduce its diameter, thus forming a short section 21 of smaller diameter than the main body of the shaft. To the outer end of this is secured a thrust plate 5, in any suitable manner. This has been shown as screwed in place upon the end of the shaft. Between this thrust plate 5, which is secured to and turns with the shaft, and the inner surface of the casing, at its inner end, or that end which is next to the shaft bearing, is interposed an antifrictional thrust bearing.

This antifrictional device is herein shown as consisting of a plate 6 having radially positioned bores 60 therein, in which bores are placed rollers 61. The rollers are of a diameter greater than the thickness of the plate, so that they project at the sides from the plate and contact with the thrust plates which are at each side thereof. In the combination which is placed at the inner end of the casing, the inner wall of the casing acts as one thrust plate and the plate 5 as the other.

I have shown, along with this combination, the use of thin wear plates 50 and 51. This would be desirable when and if the thrust plate 5 be made of a material which was not hardened so as to form a suitable wearing surface, and when, as would ordinarily be the case, the casing itself is made of cast iron, a material which is not suitable as a wearing surface of this kind.

The outer projecting end of the shaft 2 and a corresponding portion of the thrust pin 1 are made, the shaft with a non-circular bore 22 and the pin with a head 12 of corresponding shape, whereby the pin, while free to reciprocate lengthwise within the bore of the shaft, cannot turn with relation thereto. Between the thrust pin 1 and the setting-up screw 7 is interposed a second antifrictional set. This set, as herein shown, is essentially of the same construction as that which is interposed between the end of the shaft and the inner end of the casing and consists of two thrust plates 52 and 53, of which the plate 52 is engaged directly by the setting-up screw 7, and the plate 53 engages and is secured rotatively upon the square head 12 of the thrust pin, so that the plate 53 must turn with said thrust pin.

The plate 62, which is interposed between the two thrust plates 52 and 53, is essentially the same as the plate 6 which is employed in the other antifrictional thrust bearing. It is provided with rollers 61 carried in radial slots therein, as described for the other bearing. These plates 6 and 62, which carry the rollers, are surrounded by a band 63 to reinforce them and to prevent relative movement between the segments thereof formed by the radial bores. Any other type of antifrictional bearing which is found adapted for this purpose may be substituted for those which have been described.

The casing 4, which incloses the antifrictional bearings, is provided with a removable end plate 40 which is threaded to receive the setting-up screw 7. This setting-up screw is provided with a squared head 70 to which the operating handle, which is shown in dotted lines in Fig. 1, may be secured. The two thrust plates 52 and 53 and the plate 62 which contains the rollers which bear against these two thrust plates, are provided with axial bores in which is placed a pin 8 which maintains these parts in correct and concentric alinement. This pin 8 may be made as an integral part of the thrust pin 1 or separate therefrom as is found most suitable. The thrust plate 53, which is inward or next to the thrust pin 1, is secured to turn with said pin, as by having a recess formed in its face which closely fits over the squared or non-circular head 12 of the thrust pin.

With a device of this character, all frictional surfaces having movement relative to each other are rolling surfaces and there are no frictional surfaces sliding or turning upon each other. In consequence, the frictional resistance is diminished and also wear which necessitates removal of parts, is reduced to such a small amount that it may be said to be negligible. In consequence, a friction set of this kind may be operated indefinitely without necessity for replacing worn parts. It is, of course, contemplated that oil or grease be employed within the casing 4 so that all of the surfaces of moving parts are oiled.

What I claim as my invention is:

1. A friction set comprising an axially bored drum shaft, a thrust plate fixed to the end of the drum shaft, a casing fixed relative to the shaft bearings, a roller bearing between said thrust plate and the said casing, a thrust pin reciprocable in the bore of the shaft and held to rotate therein, a thrust plate fixed to the outer end of the thrust pin to turn therewith, a setting-up screw carried by the casing and engaging the last named thrust plate, and a roller bearing interposed between said last named thrust plate and the thrust plate which is carried by the thrust pin.

2. A friction set for winding drums comprising an axially bored drum shaft, a thrust plate secured to the end of the drum shaft, a thrust pin reciprocable in said bore, the outer end of the said bore and the thrust pin having a non-circular section whereby the two are caused to turn together, a thrust plate secured to the outer end of the thrust pin, a setting-up screw, a thrust plate against which the setting-up screw acts, anti-frictional bearings between the two last named thrust plates and supporting the thrust plate carried by the drum shaft.

3. A friction set comprising an axially bored shaft projecting beyond its bearing, a fixed casing inclosing the projecting end of the shaft, a thrust plate fixed to the outer end of the shaft and within the casing, an antifrictional bearing interposed between said thrust plate and the inner end of the casing, a thrust pin reciprocable within the bore of the shaft and secured against rotation therein, a setting-up screw mounted in the outer end of the casing, a thrust plate carried by and turning with the outer end of the thrust pin, a thrust plate within the casing and engaged by the setting-up screw, and an antifriction bearing between the two last mentioned thrust plates.

Signed at Elma, Grays Harbor county, Washington this 21st day of August 1920.

JAMES N. WISDOM.